March 25, 1969  R. J. RUSSELL  3,434,200

METHOD OF MANUFACTURING HARD-FACED METAL PRODUCTS

Filed Dec. 1, 1965

Robert J. Russell,
Inventor.
Koenig, Senniger, Powers and Leavitt,
Attorneys.

United States Patent Office 3,434,200
Patented Mar. 25, 1969

3,434,200
METHOD OF MANUFACTURING HARD-FACED METAL PRODUCTS
Robert J. Russell, North Dighton, Mass., assignor to Texas Instruments Incorporated, Dallas, Tex., a corporation of Delaware
Filed Dec. 1, 1965, Ser. No. 510,845
Int. Cl. B23p 17/04
U.S. Cl. 29—527                                    9 Claims

ABSTRACT OF THE DISCLOSURE

Three thin metal layers are provided, one of which is aluminum and which is interposed between the other two. One of the latter is composed of stainless steel and the other of a bonding metal for brazing or soldering. The bonding metal has a lower melting point than that of aluminum and steel. The three layers are metallurgically bonded preferably in the solid phase to form a laminated stock. The stock after suitable shaping is placed in a mold prior to the introduction of melted aluminum into the mold. Prior to this introduction the metal bonding layer of the stock has been heated to form a melt thereof without melting the other layers of the stock. The introduction of the aluminum occurs over the melted bonding metal layer so as to fill the mold and combine with the molten layer of bonding metal in the liquid phase. After cooling to solidify the aluminum and the combined molten metals the product is removed from the mold. It has a rupture- and void-free transition zone between the two masses of aluminum which were initially on opposite sides of the bonding metal.

---

This invention relates to soleplate assemblies for flatirons and the like.

Among the several objects of the invention may be noted the provision of a method by which a hard metal facing of a material such as stainless steel may reliably be attached to aluminum or like cast material to form a complete soleplate of a flatiron such as used for ironing; the provision of a method for applying a hard metal layer to a soleplate base by a convenient casting-on process; the provision of laminated soleplate stock prepared for use in the casting process; and the provision of an improved complete soleplate manufactured according to the method of the invention. Other objects and features will be in part apparent and in part pointed out hereinafter.

The invention accordingly comprises the products and methods hereinafter described, the scope of the invention being indicated in the following claims.

In the accompanying drawings, in which one of various possible embodiments of the invention is illustrated:

Corresponding reference characters indicate corresponding parts throughout the several views of the drawings.

For clarity of illustration, the sizes, thicknesses, etc. are exaggerated; hence the drawings are not to scale. In the present application, reference to metals is intended to include alloys.

A form of soleplate assembly for flatirons has been made by attaching a stainless steel layer to a soleplate base by mechanical means, as for example by spraying a layer of metal (such as nickel) on a sheet of stainless steel to form a rough surface on the stainless steel. This has provided a textured area to which a cast-on metal base was made to adhere by a mechanical interlocking holding action. U.S. Patents 3,099,869 and 3,173,202 are typical in this regard.

Briefly, according to the present invention a flatiron soleplate is manufactured by using laminated metallurgically bonded soleplate stock material of the invention comprising a hard metal layer or sheet forming one face and a metallic bonding layer or sheet forming the other face of the stock. This stock is blanked to the desired shape and placed, with its bonding layer up, in a conformed mold die cavity where it is preheated to a temperature above the melting point of the bonding layer. Then a base layer of molten metal is introduced into the cavity and thereby cast on and alloyed with the melted bonding layer. The molten base metal and the melted bonding material of the soleplate stock combine to form an alloy. The molten metals are then cooled and the resulting soleplate assembly removed from the mold. The resulting article comprises a soleplate assembly having a strongly adhered hard-faced bottom side for contact with clothes or other articles to be ironed, and a top side for mounting the handle, controls et cetera.

Figure 1:
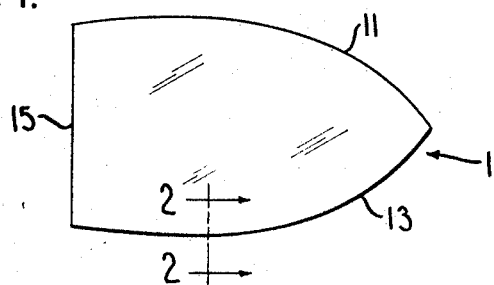
FIG. 1 is a plan view of soleplate stock shaped for use as part of a flatiron soleplate.
Figure 2:
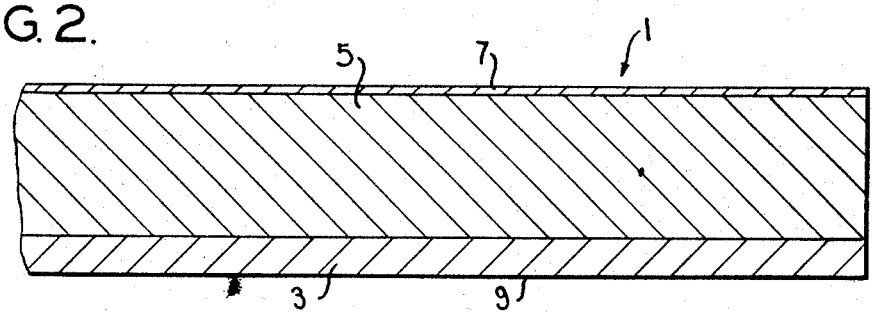
FIG. 2 is an enlarged fragmentary section of the stock taken on line 2—2 of FIG. 1.

Referring now to FIGS. 1 and 2 of the drawings, a laminated soleplate stock material of the invention is generally designated 1 and comprises three sheets or layers 3, 5 and 7 which are metallurgically bonded together, preferably by the solid-phase bonding processes described in Boessenkool et al. U.S. Patent 2,691,815 or Boessenkool et al. U.S. Patent 2,753,623. The teachings of these patents are incorporated herein by reference. The layer 3 is preferably a hard, dense metal such as stainless steel having a smooth lower surface 9 for contacting clothes or other articles to be ironed. The intermediate layer 5 is aluminum, for example. Layer 7 is a bonding layer and comprises a braze alloy or a solder alloy. The three layers are metallurgically bonded, preferably by solid-phase bonding. A zinc solder alloy has been found satisfactory for layer 7. The bonding layer 7 preferably melts at a lower temperature than the layers 3 and 5. The braze alloy or solder alloy should be capable of being bonded to aluminum layer 5. It may be a substantally pure zinc or a standard braze alloy such as 4343. Selection of the braze or solder alloy will depend in part on the desired melting point of the layer 7 and the ultimate application of the laminated material. The melting temperature of the zinc material is about 700° F. to 800° F. This laminated product can be used in the manufacture of other cast articles where hard wearing surfaces are needed. While the relative thickness of layers 3, 5 and 7 can be widely varied to meet a particular need or use, by way of example, the layers 3 may be approximately 0.005 to 0.065 inch thick, the layer 5 about 0.001 to 0.040 inch thick and the layer 7 about 0.001 or thinner to 0.010 inch thick.

The soleplate composite stock 1 is blanked to the desired size and configuration, as illustrated in FIG. 1, wherein it has two generally arcuate sides 11 and 13 which meet at a point at one end of the blank. At the other end of the blank there is a straight edge 15. The shaping of the composite stock may be accomplished by any suitable process.

After the soleplate stock has been shaped it is placed in a die cavity of a mold with layer 7 uppermost. It is then preheated to a temperature sufficiently high to melt the bonding surface of layer 7 of the stock. When layer 7 is a zinc alloy, a preheat temperature of about 700° F. to 950° F. is satisfactory.

Figure 3:
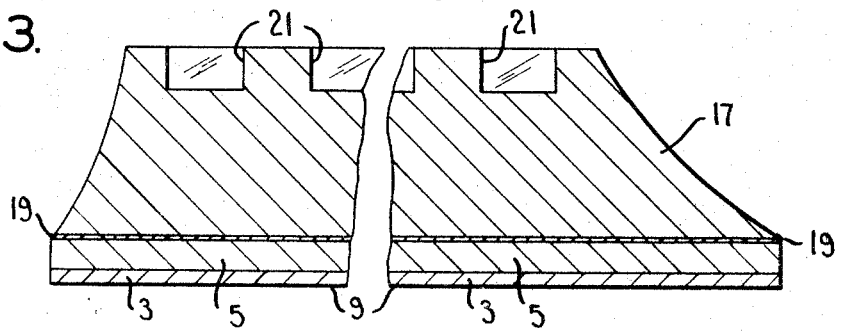
FIG. 3 is a cross section, partially broken away, through a flatiron soleplate employing the stock of FIGS. 1 and 2.

When layer 7 is melted, a molten metal (such as 380 aluminum) is injected into the mold over the layer. This metal completely fills the mold and results in the formation of a soleplate base designated 17 in FIG. 3. The mold is of proper shape to form the top of the soleplate, with, for example, recesses illustrated at 21. The metal of base 17, while liquid, combines metallurgically in the liquid phase with the molten metal of layer 7 to form an alloy layer, which may be of varying thickness, designated 19. It is important to melt the layer 7 prior to pouring the melted metal of base 17 on it, for otherwise the desired strong bonding between the soleplate stock and the solidified base 17 will not occur.

The alloy 19 formed by this process will depend upon the metal used in the layer 7 and the poured metal used for base 17. In the specific example given, the layer or alloy 19 is a zinc-aluminum alloy comprising zinc from layer 7 and aluminum from the metal forming base 17. It will be understood that the precise composition of this alloy can vary throughout layer 7 and from point to point on the surface of layer 7. The metallurgical bond between the aluminum of layer 5 and aluminum of base 17 shows a transition from one metal to the other without intervening ruptures or voids.

The aluminum forming the base 17 can be injected into the mold at various temperatures such as, for example, in the range of from 1150° F. to approximately 1350° F. The die temperature is generally in the range of about 400°–1200° F. The injection may, for example, take place under the pressure of gravity up to a pressure of about 2000 lbs. gauge pressure or more. The hot mold-holding time may vary from about 5 to 30 seconds or in some cases even more. Then the molded soleplate is cooled to a temperature in the range of about 400° F. to 700° F. before ejecting it from the mold. Cleaning of stock 1 does not produce any perceptible improvement in the metallurgical bond obtained between it and the soleplate base 17. Therefore it can be used as it is received with oil and grease on it. These are advantages because procedures are thus simplified.

In view of the above, it will be seen that the several objects of the invention are achieved and other advantageous results attained.

As various changes could be made in the above methods and products without departing from the scope of the invention, it is intended that all matter contained in the above description or shown in the accompanying drawings shall be interpreted as illustrative and not in a limiting sense.

What is claimed is:

1. The method of manufacturing a product having a cast body of one material and a facing of material which is substantially harder than the material of the body, comprising forming a laminate of metallurgically bonded layers, one layer of which is composed of said harder material to expose a hard outside face on the finished product and another layer of which is composed of a metal bonding material for exposure to subsequent casting thereon of molten body material, said metal bonding material having a melting temperature below that of both the body and facing materials, placing the laminate in a mold, and with the bonding layer theretofore heated to a temperature sufficient to form a melt of the bonding layer introducing into the mold a flow of the melt of the body material to combine some of the melt of the body material with that of the bonding material in the liquid phase of each.

2. The method according to claim 1, wherein the laminate includes an intermediate layer of the body material between said hard layer and said bonding material.

3. The method according to claim 1, wherein metallurgical bonding of the layers of the laminate is performed in the solid phase.

4. The method according to claim 3, wherein the laminate includes a layer of the body material between said hard layer and said layer of bonding material.

5. The method according to claim 4, wherein said material forming said outside face is steel, said bonding material is composed of metal selected from the group consisting of zinc and braze alloy 4343 and the body material is aluminum.

6. The method according to claim 2, wherein the thickness of the layer of hard facing material in the laminate is in the range of 0.005–.065 inch, the thickness of the bonding material is less than about 0.010 inch and the thickness of said intermediate layer of body material is in the range of 0.001–0.040 inch.

7. The method according to claim 6, wherein metallurgical bonding of the layers of the laminate is performed in the solid phase.

8. The method according to claim 7, wherein the material forming said outside face is stainless steel, said bonding material is composed of a material selected from the group consisting of zinc and braze alloy 4343, the material of the body and intermediate layer being aluminum.

9. The method according to claim 1, including the step of shaping the laminate to a desired configuration prior to its insertion into the mold.

References Cited

UNITED STATES PATENTS

| | | | |
|---|---|---|---|
| 2,807,700 | 9/1957 | Jepson | 29—529 |
| 2,893,083 | 7/1959 | Ladd | 164—75 |
| 2,908,073 | 10/1959 | Dulin. | |
| 3,090,118 | 5/1963 | Hanzel | 29—527 |
| 3,099,869 | 8/1963 | Piper | 164—75 |
| 3,173,202 | 3/1965 | Farber | 29—502 |
| 3,186,045 | 6/1965 | Lagostina | 164—75 |
| 3,213,534 | 10/1965 | Swanke | 29—529 |

JOHN F. CAMPBELL, *Primary Examiner.*

P. M. COHEN, *Assistant Examiner.*

U.S. Cl. X.R.

29—502, 503, 504; 164—75